Figure 1:
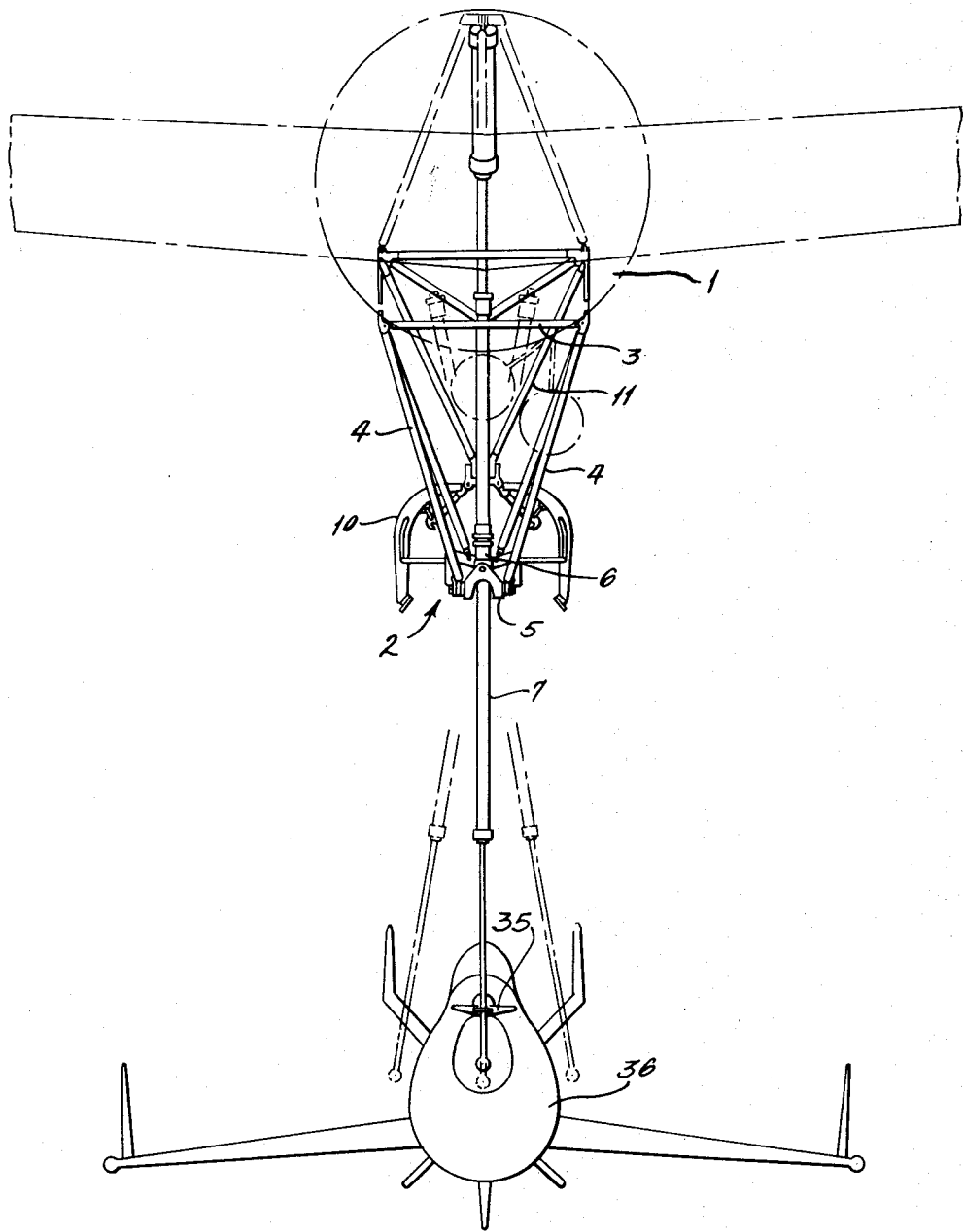

Sept. 29, 1953     H. D. BARKEY     2,653,777
PARASITE PLANE RETRIEVING AND TOWING MECHANISM
Filed Nov. 28, 1951     6 Sheets-Sheet 3

INVENTOR:
HERMAN D. BARKEY

BY Carr & Carr & Gravely
ATTORNEYS,

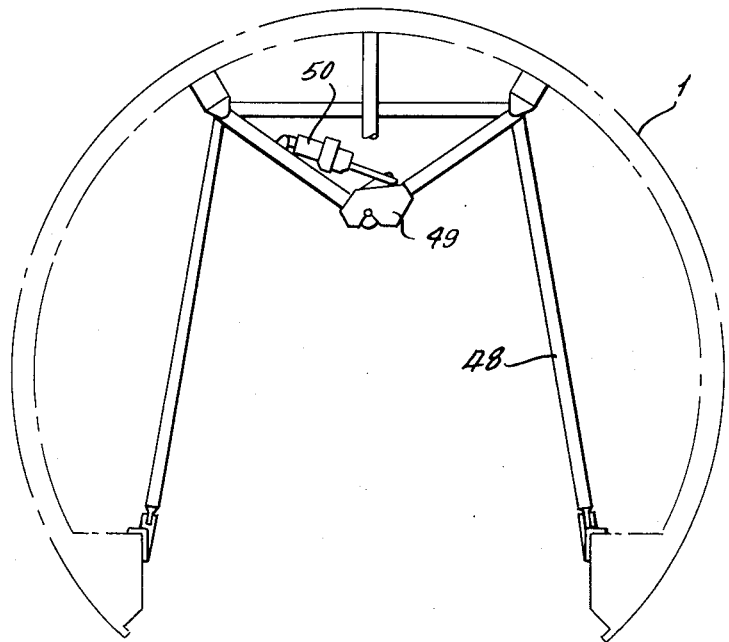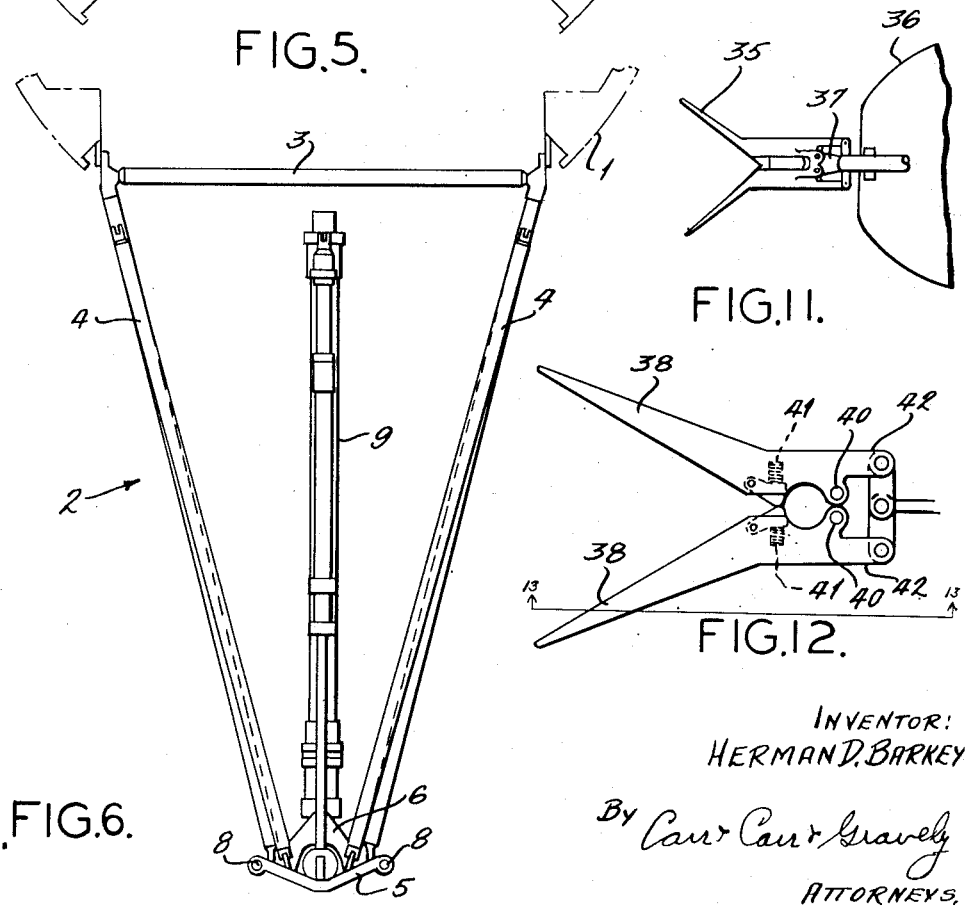

Sept. 29, 1953          H. D. BARKEY          2,653,777
PARASITE PLANE RETRIEVING AND TOWING MECHANISM
Filed Nov. 28, 1951          6 Sheets-Sheet 5

INVENTOR:
HERMAN D. BARKEY
By Carr & Carr & Gravely
ATTORNEYS.

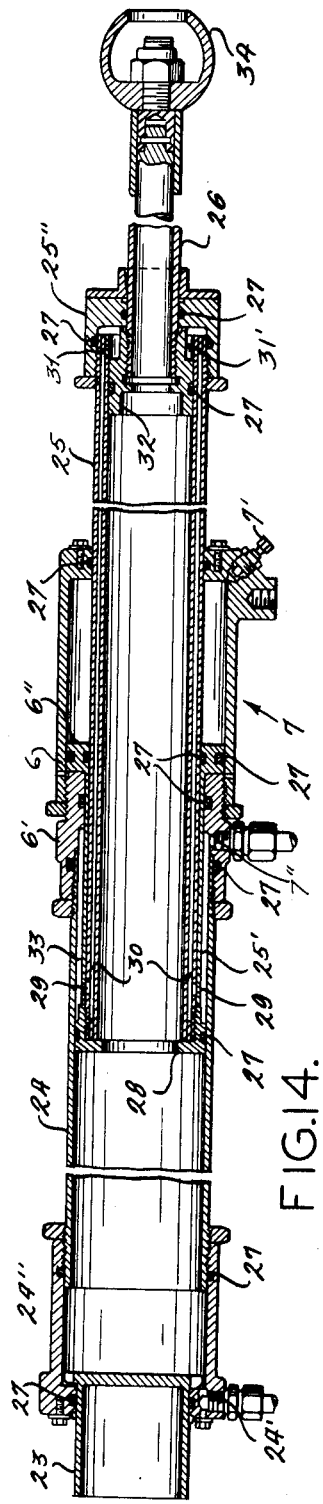
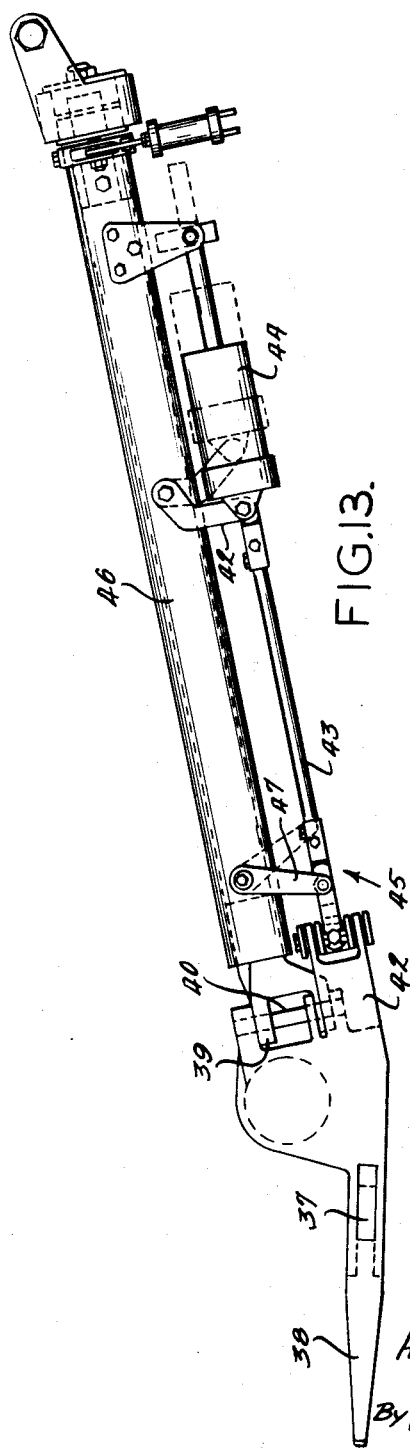

Patented Sept. 29, 1953

2,653,777

UNITED STATES PATENT OFFICE 2,653,777

PARASITE PLANE RETRIEVING AND TOWING MECHANISM

Herman D. Barkey, Ferguson, Mo., assignor to McDonnell Aircraft Corporation, St. Louis, Mo., a corporation of Maryland Application November 28, 1951, Serial No. 258,588

5 Claims. (Cl. 244—2)

This invention relates to aircraft towing and retrieving mechanism adapted for mounting in a tow plane, and is more particularly directed to devices therein for rapidly attaching and detaching parasite aircraft.

The primary object of the invention is to provide a towing mechanism that will permit a parasite plane to roll, pitch and yaw, as well as move vertically, laterally, or fore and aft.

Another object of the invention is to provide a grab hook for a parasite plane that will permit release thereof by the pilot of the parasite plane.

A further object of the invention is to provide a flexible trapeze equipped with extensible means for arresting or releasing a parasite plane without flying same in close proximity to the tow plane.

This invention consists in the provision of a foldable trapeze pivotally connected to the frame of a towing aircraft, the trapeze having an extensible member therein for arresting and releasing a parasite plane far enough below the tow plane that the mutual interference from slip stream, downwash and pressure gradients will have only a minimum effect thereon, the extensible member being connected to the tow plane in such a way that it can be moved sidewise, fore or aft, the parasite plane having a grab hook thereon that permits the parasite plane to roll, pitch and yaw.

The invention also consists in the provision of extensible means for lifting the parasite plane into the tow plane and which also has means thereon for grasping the tail section of the parasite plane, the two extensible means jointly acting to launch and retrieve the plane with minimum effort and maximum speed.

Figure 2:
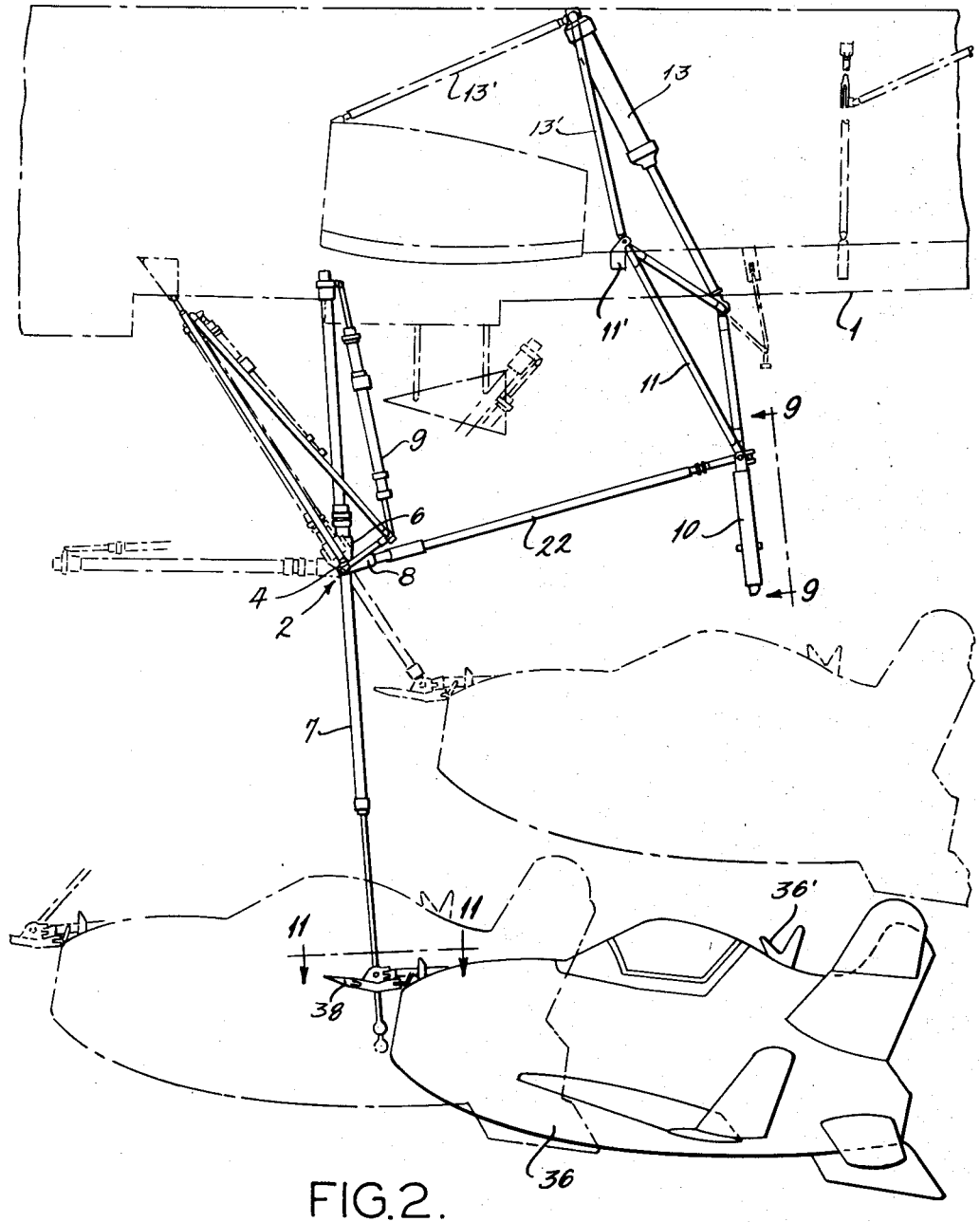
Figure 3:
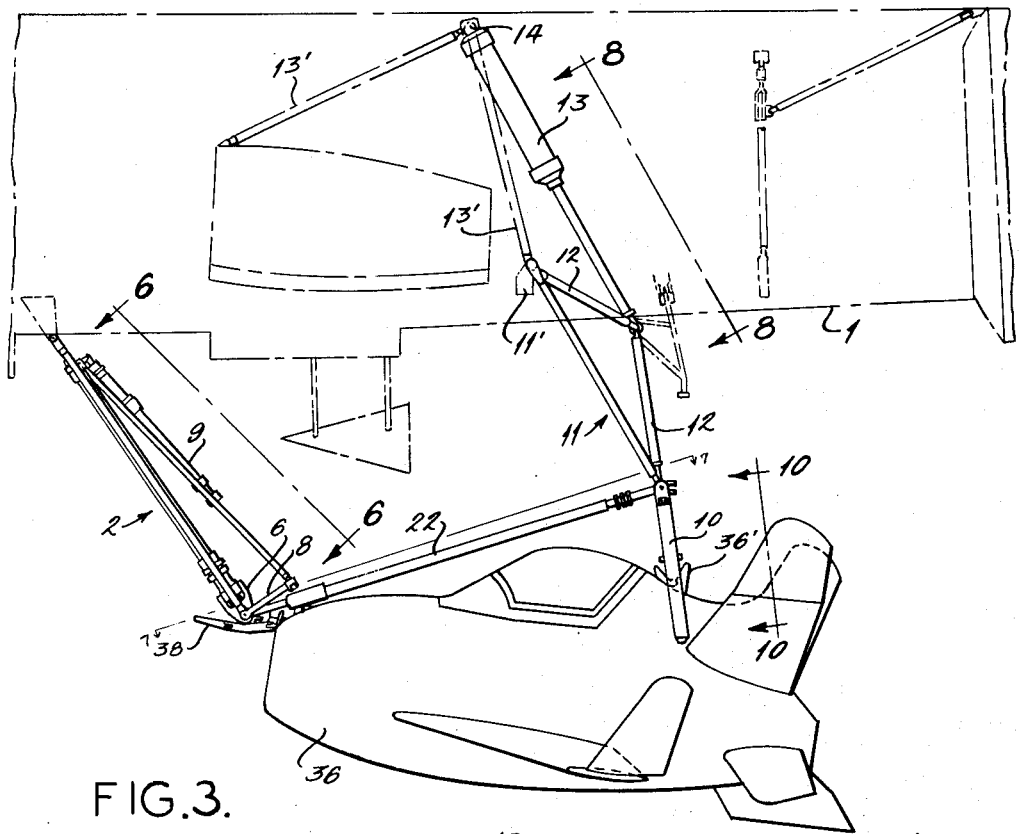
Figure 4:
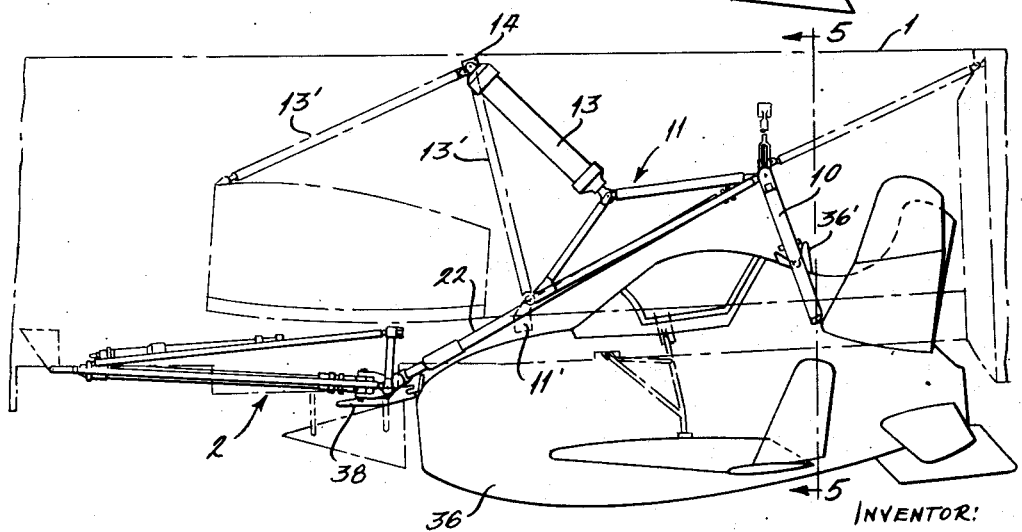
Figure 7:
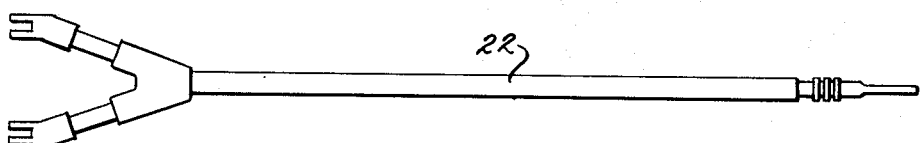
Figure 9:
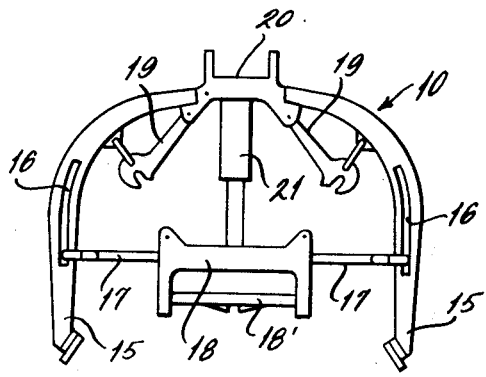
Figure 10:
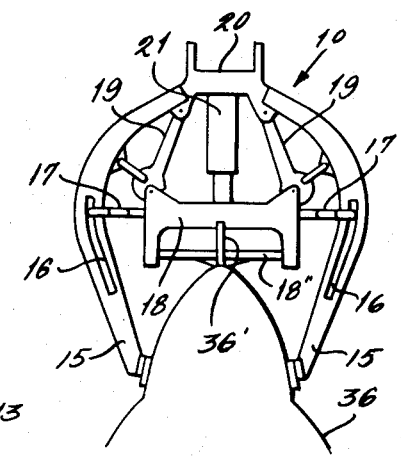
Figure 8:
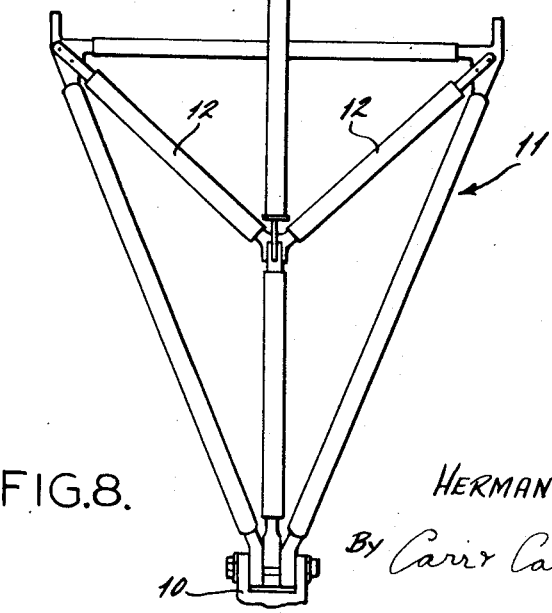

In the drawings:

Fig. 1 is a front elevational view of the extended trapeze showing the parasite plane attached thereto, Fig. 2 is a side elevational view of the structure illustrated in Fig. 1, Fig. 3 is a side elevational view similar to Fig. 2 showing the trapeze in a partially folded position, Fig. 4 is a view showing the trapeze in folded condition with the parasite plane stowed within the tow plane, Fig. 5 is a view taken substantially along the line 5—5 of Fig. 4, Fig. 6 is a view looking substantially in the direction along the line 6—6 of Fig. 3, Fig. 7 is a view taken substantially along the line 7—7 of Fig. 3, Fig. 8 is a view looking substantially in the direction of the line 8—8 of Fig. 3, Fig. 9 is a view looking substantially in the direction of the line 9—9 of Fig. 2, Fig. 10 is a view looking substantially in the direction of the line 10—10 of Fig. 3, Fig. 11 is a view looking substantially in the direction of the line 11—11 of Fig. 2, Fig. 12 is an enlarged plan view of a part of the device shown in Fig. 11, Fig. 13 is an enlarged side elevational view taken substantially along the line 13—13 of Fig. 12; and Fig. 14 is a longitudinal sectional view of the telescoping tube for arresting flight motion of parasite planes.

This invention is embodied in the structure shown in the several views of the drawings in which the numeral 1 designates a section of the fuselage of the tow plane. A yoke 2 is pivoted to the aircraft fuselage, which yoke is made up of a base member 3 (Fig. 6) with the side members 4 secured thereto. The outer or lower ends of the side members 4 have a connecting member 5 secured thereto, this connecting member being shorter than the base member 3 so that the yoke may have a substantially trapezoidal shape. Disposed between the lower ends of the side members is a support 6 (Fig. 14) pivoted at the outboard ends thereof, the yoke supporting a telescoping tube 7, the details of which will be hereinafter described.

Also connected between the lower ends of the side members 4 is a yoke 8 (Fig. 2) to one end of which is connected a positioning cylinder assembly 9, the other end being connected to the upper end of the telescoping tube 7. Suitable trusses are provided for holding the cylinder assembly 9 in position.

The tail of the parasite plane is lifted into the fuselage by means of a yoke 10 connected to another yoke 11 constructed similar to the yoke 2. The yoke 11 is pivotally supported in the fuelage on brackets 11′ and is provided with struts 12 extending from the corners thereof and joined substantially at the mid-point of the projected area of yoke 11. A retracting cylinder 13 is connected at the junction point of the struts and is also connected to the fuselage by means of a pin 14. Trusses 13′ provide strengthening for the yoke 11 and stabilize the action of cylinder 13.

The yoke 10 (Figs. 9 and 10) comprises a clamp consisting of pivotal arms 15 provided with slots 16. Slidably received in said slots are rods 17 mounted in the connecting member 18. This connecting member is supported by means of arms 19 suitably secured to the stationary part 20 of the clamp, connecting member 18, and arms 15. A cylinder 21 is secured to the stationary part 20 and is also connected to the member 18 for actuating the clamp arms 15 for bringing them into engagement with the tail of the aircraft, holding it rigidly therebetween. A bar 18' in the connected members 18 engages with a latch 36' secured to the parasite plane for suspending the plane from grab hook mechanism. A bar 22 is connected between the outer ends of yokes 2 and 11 for maintaining them in predetermined spaced relationship.

The telescoping tube 7 is made up of a plurality of tubular members 23, 24, 25 and 26. Suitable packing rings 27 are provided between each of the tubular members and cooperating parts for preventing the escape of pressure fluid therefrom. A sleeve 6' is threaded into support 6 and a sleeve 6'' is slidably received in the support 6 and may slide with or relative to member 25.

The tube 7 is expanded by having pressure fluid admitted into tube 24 through port 24'. This tube is in communication with the bore of tube 25. The tube 26 has a head 32, acting as a piston, formed thereon and slidably received in tube 25. Pressure fluid introduced into tubes 24 and 25 will force head 32 to the right-hand end of tube 25 or to fully extended position. Thereafter pressure fluid in tubes 24 and 25 will cause them to move relatively to each other until head 28 engages a shoulder on the sleeve 6'. This action will move sleeve 25' until the head 6''' formed thereon engages the right-hand end of support 6. An air filler valve 7' provides for precharging the buffer chamber in support 6 defined by tube 25, head 6''', and the support 6.

Contraction of the tube is accomplished by having pressure fluid introduced through port 7'' to the inner bore of sleeve 6', thence through ports 29 in sleeve 25' and outer wall of tube 25, thence passing through the cavity between the inner and outer tubes 25 to port 31' into chamber 31 formed in the cap 25'' closing the tube 25. The pressure fluid will force head 32 to move in tube 25 until it engages head 28. Thereafter pressure will pass directly from port 7'' into the space between tube 25, sleeve 25' and tube 24, causing it to act on head 28, first moving sleeve 25' and head 6''' to the left until head 6''' engages sleeve 6'. Thereafter the pressure fluid will continue to move tube 25 in tube 24 until head 28 engages the closed end of tube 23. The tube 23 may also move in cap 24'' for tube 24. The tube 23 will move, when necessary, to equalize fluid displacement for compression and extension strokes during the buffer action. A suitable receiving valve will direct pressure fluid through port 24' in cap 24'' and the port 7'' in sleeve 6' depending upon the direction of motion of the several parts of tube 7. Pressure sealing rings 27 are provided at various places in tube 7 where relative motion takes place between the parts thereof.

The reverse action may be performed by compressing air in the right-hand chambers, or gravitational action may be relied on for reverse movement. When air is compressed, the expansion thereof provides the motive force.

The outer end of tube 26 has a sphere 34 connected thereto which prevents a grab hook 35 secured to the parasite plane 36 from slipping off the end of the telescoping tube 7. The pilot of the parasite plane maneuvers it so that the jaws of the grab hook receive the tubular member 26, said grab hook being provided with latches 37 for locking the parasite plane to the telescoping tube.

The grab hook 35 comprises two jaws 38 which provide a V-shaped mouth. Each of the jaws are pivotally supported on a head 39 by suitable pins 40. The latches 37 are actuated toward each other by springs 41. The jaws 38 have extensions 42 thereon and each is connected to piston rod 43 of fluid motor 44. A suitable linkage 45 is connected between the outer end of the piston rod and the extensions 42 so that the jaws will pivot about pins 40. The fluid motor is suspended from a tube 46 to which head 39 is secured. The tube 46 is carried by the parasite plane and secured thereto by suitable mechanism (not shown). Links 47 support linkage 45. The fluid motor is controlled by the pilot of the parasite plane.

During the arresting motion of the parasite plane tube 26 passes between the jaws 38, past latches 37 and is held in place thereby. The jaws 38 form a socket for the sphere 34. The fluid motor 44 is actuated for opening jaws 38 when the parasite plane 36 is to be released. The fluid motor 44 is controlled by the pilot of the parasite plane.

The connection between the telescoping tube and the lower end of the yoke 2 is so constructed that the tube may swing in the fore and aft direction through an arc of substantially 80°; and it may also swing through a sidewise or lateral arc of 20°. This range of movement permits the parasite plane to roll, pitch and yaw as well as swing fore and aft for the purpose of reducing shock to the tow plane and to the parasite plane.

When the parasite plane has been latched to the telescoping tube, pressure fluid is supplied to the respective cylinders for the purpose of elevating the parasite plane toward the tow plane. When the latter has been lifted to the full extent of movement of the telescoping tube, it is locked in position by means of the positioning cylinder 9. This action brings the tail of the plane into the clamps of yoke 10, whereupon pressure fluid is applied to cylinder 21 to clamp arms 15 thereof to the tail of the parasite plane 36. Thereafter pressure fluid is admitted to the retracting cylinder 13 which lifts the trapeze and the attached parasite plane up into the fuselage of the aircraft, as shown in Fig. 4.

The fuselage is provided with a frame 48 in which a latch 49 is mounted. This latch is actuated by a cylinder 50. When the aircraft has been lifted into the fuselage 1, the cylinder 50 has pressure fluid applied thereto, thus actuating the latch which hooks onto latch 36' on the parasite plane and prevents relative movement of the parasite plane after it has been lifted into the fuselage. The dotted line positions in Fig. 2 show the extent of fore and aft movement of the parasite plane after it has been secured to the telescoping tube; and the dotted line positions of Fig. 1 illustrate the permissible lateral movements. The plane in which the parasite plane is stowed is located relative to the inboard propellers of the tow plane so that the foregoing movements are permissible without interference of the operation of the retrieving and arresting device. The telescoping tube is of such length that the parasite plane can be arrested without being duly influenced by the slip stream of the tow plane and the driving propeller therefor.

What I claim is:

1. A towing and retrieving mechanism for stowing a parasite plane in the fuselage of an aircraft comprising, a yoke pivotally supported in the fuselage, an extensible tube universally pivotally mounted on said yoke for moving the parasite plane vertically, a grab hook securable to the aircraft to be retrieved, means for holding said grab hook on said tube, a clamp for grasping the tail of the parasite plane, means for pivotally suspending said clamp from the fuselage, means for vertically moving said clamp and said telescoping tube; and means for holding the retrieved plane in the fuselage.

2. A towing and retrieving mechanism for stowing a parasite plane in the fuselage of an aircraft comprising a yoke pivotally mounted in the fuselage, a telescoping tube universally pivotally mounted in said yoke for moving the parasite plane vertically, a grab hook securable to the parasite plane and engageable with said tube, means for holding said hook on said tube, a second yoke pivoted to said fuselage, means supported by said second yoke for holding the tail of the parasite plane, means for lifting the parasite plane into the fuselage; and means for holding the parasite plane in said fuselage.

3. A towing and retrieving mechanism for stowing a parasite plane in a fuselage comprising a yoke pivoted to said fuselage, a telescoping tube universally pivoted to said yoke for moving the parasite plane vertically, a grab hook securable to the parasite plane, means on said tube for maintaining said grab hook thereon, a second yoke pivoted to said fuselage, a tail clamp secured to said second yoke, means connecting said yokes, means for operating said telescoping tube; and means for lifting the retrieved parasite plane into said fuselage.

4. A towing and retrieving mechanism for stowing a parasite plane in a fuselage comprising a yoke pivoted to the fuselage, a tube, means for universally pivoting said tube to said yoke, a grab hook provided with V jaws securable to the parasite plane, means on said tube for holding the plane thereon, a second yoke pivotally supported in said fuselage, a tail clamp for the parasite plane secured to said second yoke, means for latching said clamp, means for telescoping said tube to move the parasite plane vertically, means for positioning said tube relative to said yoke, means for actuating said clamp; and means for lifting said tail and for holding the parasite plane in said fuselage.

5. A towing and retrieving mechanism for stowing a parasite plane in the fuselage of an aircraft comprising a yoke pivotally mounted in the fuselage, a telescoping tube universally pivotally mounted in said yoke for moving the parasite plane vertically, a grab hook securable to the parasite plane and engageable with said tube, means for holding said grab hook on said tube, means for operating said grab hook to permit it to be released from said tube, a second yoke pivoted to said fuselage; and means for lifting the parasite plane into the fuselage and for holding the plane in said fuselage.

HERMAN D. BARKEY.

References Cited in the file of this patent

UNITED STATES PATENTS

| Number | Name | Date |
|---|---|---|
| 1,869,506 | Richardson | Aug. 2, 1932 |
| 2,365,827 | Liebert | Dec. 26, 1944 |
| 2,585,030 | Nosker | Feb. 12, 1952 |

FOREIGN PATENTS

| Number | Country | Date |
|---|---|---|
| 546,587 | Great Britain | July 20, 1942 |